C. C. BUTLER.
FRICTION CLUTCH.
APPLICATION FILED APR. 19, 1915.
1,174,671.
Patented Mar. 7, 1916.
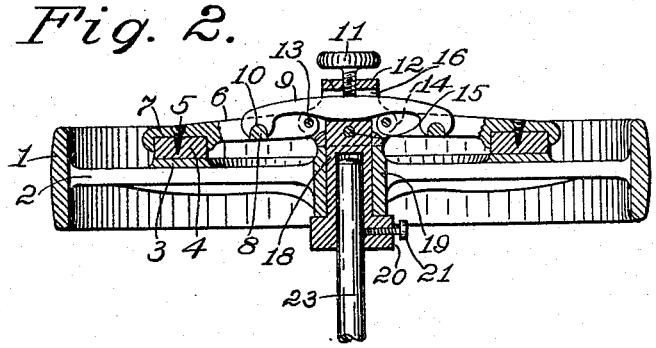
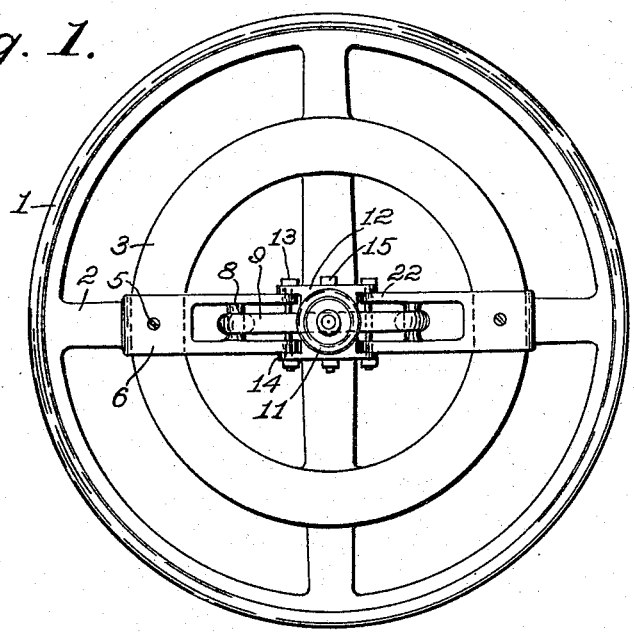
Witnesses:
Pearl Stanton
C. C. Lindner
Inventor,
Clinton C. Butler, by
G. C. Kennedy,
Attorney.

UNITED STATES PATENT OFFICE.

CLINTON C. BUTLER, OF WATERLOO, IOWA, ASSIGNOR TO CHASE MANUFACTURING COMPANY, OF MASON CITY, IOWA, A CORPORATION OF DELAWARE.

FRICTION-CLUTCH.

1,174,671.  Specification of Letters Patent.  Patented Mar. 7, 1916.

Application filed April 19, 1915. Serial No. 22,379.

*To all whom it may concern:*

Be it known that I, CLINTON C. BUTLER, a citizen of the United States of America, and a resident of Waterloo, Blackhawk county, Iowa, have invented certain new and useful Improvements in Friction-Clutches, of which the following is a specification.

My invention relates to improvements in friction clutches, and particularly to that type which employs oppositely located friction-heads movable into contact with a friction ring.

The object of my improvement is to provide in the mechanism of the clutch which operates the friction-heads, means of coordination adapted to actuate said friction-heads with equal effect, notwithstanding any variation of thickness thereof due to variation in wearing qualities. This object I have accomplished by the means which are hereinafter described and claimed, and which are illustrated in the accompanying drawings, in which:

Figure 1 is a transverse axial section of a belt-wheel mounted on a rotatable shaft, and showing my improved friction-clutch associated therewith, the latter also in partial section. Fig. 2 is an elevation of one face of said belt-wheel and friction clutch.

Similar numerals of reference denote corresponding parts throughout the several views.

The numeral 23 denotes a rotatable driven-shaft, having a socket-sleeve 18 secured on one end thereof by means of a set-screw 21. The sleeve has an annularly widened part 20, and the hub 19 of a belt-wheel 1 is rotatably mounted upon the sleeve to abut upon the annular part 20 thereof. The other or outer end of the socket or sleeve 18 projects beyond the hub 19. Upon the projecting outer end of the sleeve 18 a hollow bearing-body 12 is secured by means of a bolt 15, and has on opposite sides and separated by its hollow 16, the bearing ears or lugs 14 connected by pintles 13 on which are pivotally mounted the inner ends of the swing-arms 6.

The spokes 2 of the belt-wheel 1 carry an integral flat friction-ring 3, concentric with the shaft 23 and facing the arms 6. The arms 6 are transversely grooved or socketed at 7 on their opposed faces to seat wooden or fiber friction-blocks 4 abutting upon said friction ring 3, and said blocks are secured to said arms by screws 5 or other securing-means. The arms 6 have their inner parts divided or bifurcated into forks 22, connected midway by integral cross-bars 8. The numeral 9 denotes an equalizing body passed through the hollow 16 across the socket-body 18, and having its ends extending radially over the interspaces of the bifurcated parts of said arms 6. The outer ends of the body 9 have transverse grooves or hollows 10 fittingly seated upon the cross-bars 8. The bearing-body 12 has a part arched over the end of said sleeve 18 and spaced therefrom and from the inclosed middle part of the body 9 for a short distance, and has a threaded orifice to receive a screw provided with a hand-wheel 11, said screw adapted to bear against said body 9 medially more or less as desired.

When it is desired to rotate the shaft 23, the belt-wheel 1 being in rotation, the hand-wheel 11 is turned enough to cause the end of its screw to engage and produce a sufficient amount of compression upon the middle of the body 9, whose ends press upon the cross-bars 8 of the arms 6 to cause the friction-blocks 4 to contact frictionally with the friction-ring 3. Rotation is thus gradually communicated to the arms 6, lever 9, bearing body 12 and shaft 23.

In case the blocks 4 become of different thickness, due to unequal resisting qualities and different amounts of wear under use, the body 9 keeps the blocks under equal frictional compression upon the friction-ring 3, nevertheless, because of its being free to tilt or swing relatively to either block and the said operating screw. The body 9 simply rocks enough to take up the difference in thickness of said blocks, to keep them bearing equally upon the friction-ring, so that both blocks are equally effective at all times. The blocks are released by turning the hand-wheel in a reversed direction.

Having described my invention, what I claim as new, and desire to secure by Letters Patent, is—

1. In combination, a rotatable shaft, a belt-wheel rotatably non-slidably mounted thereon and provided with a friction-face on one side, friction-blocks abutting upon said friction-face on opposite sides of side shaft, means for simultaneously moving said friction-blocks into frictional contact with said friction-face, and means for equalizing the action of the first-mentioned means upon said blocks to compensate for differential wear thereof.

2. In combination, a rotatable shaft, a belt-wheel rotatably non-slidably mounted thereon and provided with a friction-face on one side, like arms hingedly connected to said shaft to extend oppositely therefrom over said friction-face, friction-blocks mounted on the outer ends of said arms to abut upon said friction-face, a transverse body mounted across said belt-wheel and bearing at its ends upon the said arms to cause the friction-blocks thereon to bear equally upon said friction-face, and means for moving said body to compress the said blocks frictionally upon said friction-face.

3. In combination, a rotatable shaft, a belt-wheel rotatably non-slidably mounted on an end thereof, said belt-wheel having on one face a flat friction-ring concentric with said shaft, like oppositely extending arms hingedly connected to a housing on the end of the shaft and having friction-blocks on their outer ends adapted to be swung into frictional contact with said friction-ring, a transverse body seated across the belt-wheel over said arms with its ends bearing upon the arms at equal distances from the axis of the wheel, a housing fixedly secured upon the end of said shaft and transversely channeled to receive said transverse body therethrough and having an interiorly-threaded orifice alined with the axis of the shaft, and a screw seated in said orifice to bear against said transverse body to move it with said arms to bring the friction-blocks into equal frictional contact with said friction-ring.

Signed at Mason City, Iowa, this 3rd day of April, 1915.

CLINTON C. BUTLER.

Witnesses:
W. L. PATTON,
J. L. McINTYRE.

Copies of this patent may be obtained for five cents each, by addressing the "Commissioner of Patents, Washington, D. C."